April 20, 1954  C. A. ELLIS ET AL  2,675,738
OPTICAL LENS TESTING INSTRUMENT

Filed Oct. 18, 1949  4 Sheets-Sheet 1

INVENTOR.
CHARLES A. ELLIS
MILTON R. THORBURN
BY
*Louis L. Vagnon*
ATTORNEY

April 20, 1954

C. A. ELLIS ET AL 2,675,738

OPTICAL LENS TESTING INSTRUMENT

Filed Oct. 18, 1949

INVENTOR.
CHARLES A. ELLIS
MILTON R. THORBURN
BY
Louis L. Gagnon
ATTORNEY

Patented Apr. 20, 1954

2,675,738

UNITED STATES PATENT OFFICE 2,675,738

OPTICAL LENS TESTING INSTRUMENT

Charles A. Ellis, Southbridge, and Milton R. Thorburn, Sturbridge, Mass., assignors to American Optical Company, Southbridge, Mass., a voluntary association of Massachusetts Application October 18, 1949, Serial No. 121,916

15 Claims. (Cl. 88—56)

This invention relates to optical instruments and has particular reference to optical instruments of the type used for determining the axial relation of the surfaces of bitoric lenses.

The principal object of this invention is to determine the axial relation of the surfaces of finished or semi-finished bitoric lenses by providing telescope means for viewing images formed by reflections of a point source of light from the surfaces of a lens being tested and by further providing means for registering the variation in said axes as indicated by the respective angular positions of the images in the telescope means.

Another object is to provide a device embodying lens supporting means and a source of light which is directed upon a lens carried by said supporting means, and telescopic means for receiving an image or images of said light as it is reflected from the particular lens surface or surfaces being examined, with said image or images being in the form of lines of light which indicate the axis of curvature of the surface or surfaces, with further means being provided for registering the degree of variance of said axes.

Another object is to provide a device of the above character embodying means for supporting a bitoric lens, a light source mounted to direct light upon said lens, and a telescopic device for receiving images formed by said light as it is reflected from the respective side surfaces of the lens being examined, with said light source being adjustable transversely with respect to the optical axis of the lens whereby images indicating the respective axes of the curved surfaces of the lens will appear in adjacent spaced relationship in the telescope device.

Another object is to provide a device of the above character for determining the respective relations of the axes of the curved surfaces of bitoric lenses, which lenses may be either completely surfaced or only partially surfaced, whereupon in the latter case any error in alignment of the respective axes can be corrected when subsequently finishing said surfaces.

Another object is to provide a device of the above character which can be used for determining the amount of prism in a lens.

Another object is the provision of a device of the above character which is simple in construction, efficient in operation and relatively inexpensive to manufacture.

Other objects and advantages will be apparent from the following description read in conjunction with the accompanying drawings, in which.

In the manufacture of articles such as ophthalmic lenses, in many instances it is essential that the lenses be provided with surface curvatures in designated meridians exactly as prescribed. Therefore, when a lens blank has been provided with one finished surface, it is extremely important that the blank be aligned in the surfacing machine for generating the second surface in the exact position whereby the axis of said second surface will be accurately angularly disposed, as required, with respect to the axis of said first surface. When a lens blank is blocked, it is positioned with respect to its base curve axis and cylinder axis as well as other factors of the finished prescriptive power which the resultant lens is to possess and is fixedly attached to and retained by a block while in that position. Since a blocked lens blank must be surfaced in accordance with the position of the blank as determined during the blocking operation, it is essential, if the blank is to be surfaced accurately, that it be transferred to a surfacing machine with its axis positioned exactly as desired.

Heretofore it has been common practice to insert a lens blank in a surfacing machine by merely relying upon the operator's eyesight to align the blank in the bridle of the surfacing machine so that when the bridle is inserted in a machine such as a cylinder grinder the blank will be axially aligned in the machine on the axis on which it was blocked, and subsequently surfaced. However, by relying only on the human element for accurate alignment, many inaccuracies resulted since a careless or inexperienced operator or an operator having defective vision might improperly position the blank with respect to its axis and consequently blanks might be inaccurately surfaced.

A major problem to be met in forming the surfaces of bitoric lenses is to locate the cylinder axis of the second surface of such a lens either exactly in alignment with or at a given angular position with respect to the cylinder axis of the first finished surface. The present invention meets this problem by making use of the reflected image or images of a light source formed by the surfaces of a lens being examined, the image or images being observed through a telescope with proper cross reticle as a datum line, with the lens to be examined being carried by a rotatable fixture whereby angular displacements can be controlled.

Referring more particularly to the drawings wherein like characters of reference designate like parts throughout the several views, the device embodying the invention comprises a pair of spaced uprights 15 and 16 connected by a lower brace bar 17 and spaced upper guide bars 18 and 19. The upper guide bars 18 and 19 carry an upwardly extending supporting bracket 20 which is slidable on the guide bars 18 and 19 for longitudinal adjustment therealong and adapted to be retained in adjusted position by a set screw 21. The upper end of the bracket 20 has fixedly secured thereto a conventional telescope 22 which is provided with the usual lens system 23 and focusing mechanism 24.

A second upwardly extending bracket 25 is slidably mounted on the guide bars 18 and 19 adjacent one end thereof and carries a disc-like protractor element 26 which is rotatably mounted thereon. The element 26 is provided with a hub portion 28 which is adapted to extend through an opening in the supporting member 25 and has a collar 29 threadedly mounted on its ends, which collar 29 is adapted to prevent displacement of the element 26 and is provided with a knurled peripheral surface whereby it may be gripped to manually rotate the protractor element. The collar 29 is retained in position on the hub 28 by means such as a set screw 30.

The peripheral edge of the protractor element 26 is provided with a scale 26a which is adapted to be used in conjunction with an index line 27 and a vernier scale 27a provided on the bracket 25.

The front surface of the protractor element 26 is provided with a transverse guideway in which is slidably mounted a supporting member 31. The member 31 is provided with a pair of spaced forwardly extending arms 32, one adjacent each end thereof, and the protractor element 26 is provided with a forwardly extending supporting member 33 adjacent one of the arms 32. The supporting member 33 and adjacent arm 32 are provided with concentric openings for reception of an adjustment member 34, which is freely rotatable in the opening in arm 33 and is threadedly positioned in the opening in arm 32, whereby upon manual rotation of the adjustment member 34 the supporting member 31 can be made to move longitudinally of the guideway in the protractor element 26.

The forwardly extending arms 32 are each provided with notches 35 in which are located spring retainers 36 for yieldably retaining the respective arms 37 of a lens carrying bridle 38. The bridle 38 constitutes a well known but important part of a toric or cylinder grinding machine such as may be used for performing the surfacing operation on a lens blank and includes a holder 39 which is provided with a central opening 40 and to which the diametrically opposed arms 37 are secured. A lens block 42 shaped to have a portion positioned in the opening 40 in the holder 39 and retained therein by means such as a set screw 44 has a lens 41 attached thereto by suitable means such as a layer of pitch 43 or other conventional adhesive.

The lens block 42 and adhesive layer 43 are provided with concentric openings 45 and 46 respectively which are substantially in alignment with openings 47 and 48 formed respectively in the supporting member 31 and protractor element hub 27.

Figure 3:
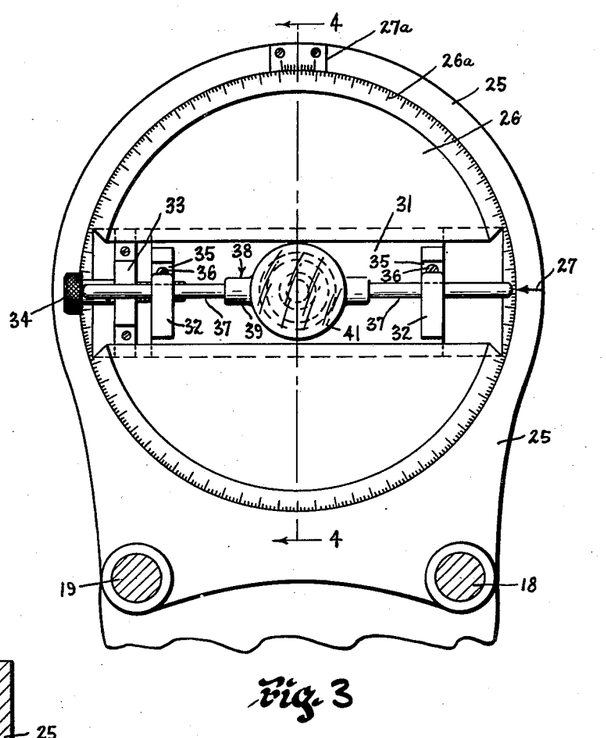
Fig. 3 is a fragmentary front view of the lens supporting means.
Figure 4:
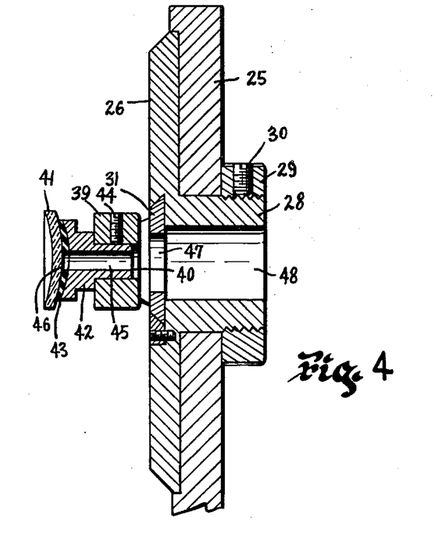
Fig. 4 is a sectional view taken on line 4—4 of Fig. 3.

In operation of the device, a lens blank which has been provided with a toric surface on one side thereof and which has its other side surface provided with either a finished or semi-finished surface, is initially accurately centered as to the finished surface and attached to a lens block 42. The lens block 42 is subsequently positioned in the ringlike member 39 forming a part of the bridle 38. Then, as illustrated particularly in Fig. 3, the bridle 38 is placed in position with the diametrically opposed arms 37 located in the notches 35 of the respective arms 32, the spring members 36 serving to retain the bridle in desired position in the notches 35.

Figure 1:
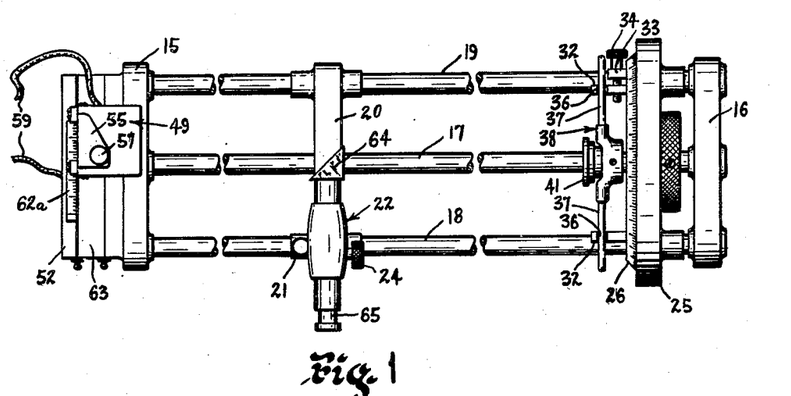
Fig. 1 is a top plan view of an axis aligning device embodying the present invention.
Figure 2:
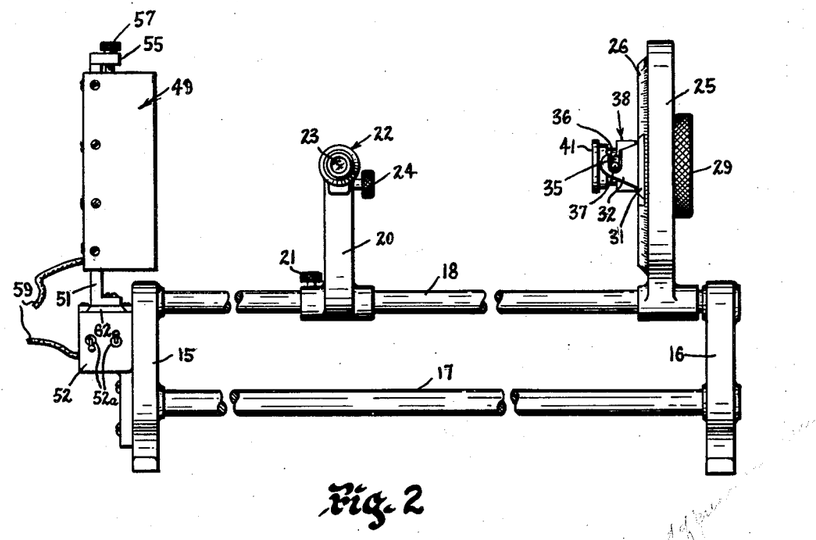
Fig. 2 is a side elevational view of the device shown in Fig. 1.
Figure 5:
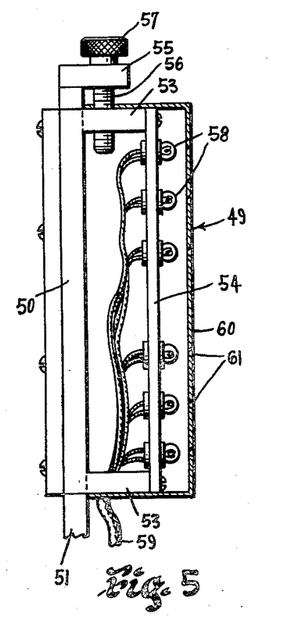
Fig. 5 is a sectional view of the light source used with the device illustrated in Fig. 1.

An illuminating device 49 is provided at the opposed end of the device and comprises a supporting bracket 50 (Fig. 5) which is slidably mounted for vertical adjustment on a supporting arm 51 which is mounted upon a switch box 52 (Fig. 2) carried by the upright 15. The supporting bracket 50 is provided with an arm 53 at each end thereof extending in a direction toward the lens supporting means, which arms 53 serve to carry the opposed ends of a lamp carrying bar 54. The upper ends of the supporting arm 51 are provided with an extension 55 having an opening therein substantially concentric with an opening in the upper arm 53 of the bracket 50. A shaft 560, having a knurled knob 57 on one end thereof, is adapted to freely rotate in the opening in the extension 55 and is provided with a threaded portion adapted to threadedly reside in the opening in the arm 53. Thus, upon manual rotation of the knob 57, the lamp supporting bracket 50 can be vertically adjusted as desired.

A plurality of lamps 58 are suitably attached to the lamp carrying bar 54 and are connected by suitable wiring 59 to a source of electric current (not shown). A housing 60 is mounted over the entire illuminating device and is provided with a plurality of small openings 61 adjacent each of the lamps 58 for controlling the light emitting from the lamps 58 and directed upon the lens 41 and thus forming point sources of light. The openings 61 are arranged in a straight line and may, if desired, be provided with lenses for providing additional control of the light directed upon the lens.

It is to be understood that in accordance with this invention, the illuminating device 49 is provided with a base portion 62 which is formed on the lower end of the supporting arm 51 and adapted to be slidably movable in a transverse guideway 63 formed in the upper surface of the switch box 52. Thus, means is provided for adjusting the light source in order to direct the light rays emitting from the lamp 58 as desired on the lens 41, and the extent of movement in making this adjustment is effectively indicated by a scale and indicator device 62a.

Suitable switches 52a are provided for controlling the supply of electrical current to the lamps 58 whereby the lamps may be all simultaneously lighted or alternately lighted, as desired.

It is to be understood that the lens 41 should be a toric lens having either concave or convex curved surfaces, and can be mounted on the block 42 with either a concave or convex surface directed toward the light source 49.

Thus, when a beam of light from one of the lamps 58 in the light source 49 is directed to the lens 41, it will be reflected from the front and rear lens surfaces 64 and 65 respectively to form astigmatic images which when viewed through the telescope 22 will appear as lines of light due to the curvature of the lens surfaces from which the light is reflected. Each image line of light will indicate the cylinder or base curve axis of the surface from which the image is reflected, depending upon which axis is being checked. The telescope 22 is provided with a prism 66 for permitting proper use of the instrument when used for viewing the images angularly rather than along a line substantially parallel to the axis of the lens.

It is also to be understood that when a plurality of the lamps 58 are lighted to throw separate beams of light upon the lens 41, the astigmatic images will appear in the form of a series of lines of light rather than a single line, the length of the lines being dependent upon the effective power of the surface from which the light is reflected.

Figure 13:
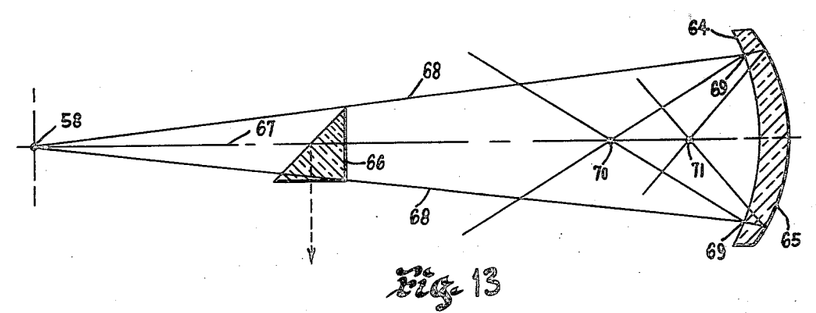
Fig. 13 is a view similar to Fig. 12 with the light source being positioned on the optical axis of the lens.

As an example, referring to Fig. 13, a point source of light 58 which is located in a vertical plane normal to the axis 67 of the system throws rays 68 of light upon the lens front surface 64. These rays contact the lens surface 64 at points 69 and are reflected backwardly to form a real astigmatic image at point 70. The light rays 68 will also pass through the lens 41 and be reflected backwardly from the rear surface 65 to form a second real astigmatic image at point 71. When the telescope 22 is focused upon one of the images 70 or 71, the image will appear as a line of light extending in a direction corresponding to the cylinder axis of the surface 64 or 65 from which the image is reflected.

However, it will be noted that when the point source of light 58 is located as stated above and lies on a line intersecting the axis 67, the image points 70 and 71 will also both lie on said axis. Therefore, it is desirable in many cases to offset the point source of light 58 so that the images of points 70 and 71 will also be offset with respect to one another when viewed in the telescope 22, rather than superimposed.

Figure 12:
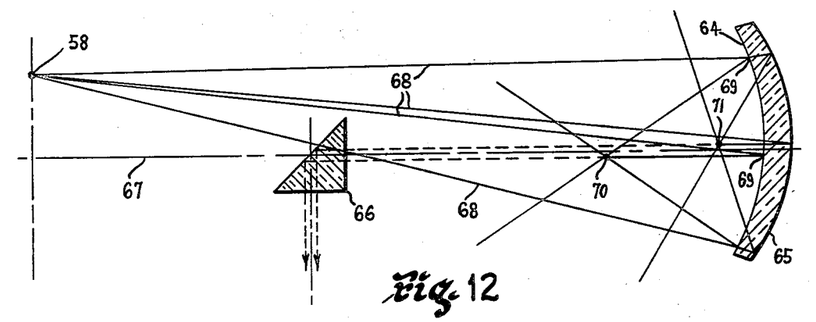
Fig. 12 is a schematic diagram illustrating the optical conditions existing when examining a lens having its concave surface directed toward the light source and with the light source being off axis.

In such a case, as indicated in Fig. 12, the light source 49 is moved transversely of the switch box 52 in the guideway 63. Thus, the point source of light 58 will be offset from the lens axis 67 and will throw rays of light 68 from one side of the axis line 67 onto the lens. The image points 70 and 71 reflected from the lens surfaces 64 and 65 respectively in this instance will also be offset. Thus, the images seen in the telescope are separated and by adjusting the lens carrying supporting member 31 on the protractor element 26 the images can be located as desired with respect to a reference line in the telescope, such as by positioning them whereby they will be viewed one on each side of a hair line 73.

Figure 14:
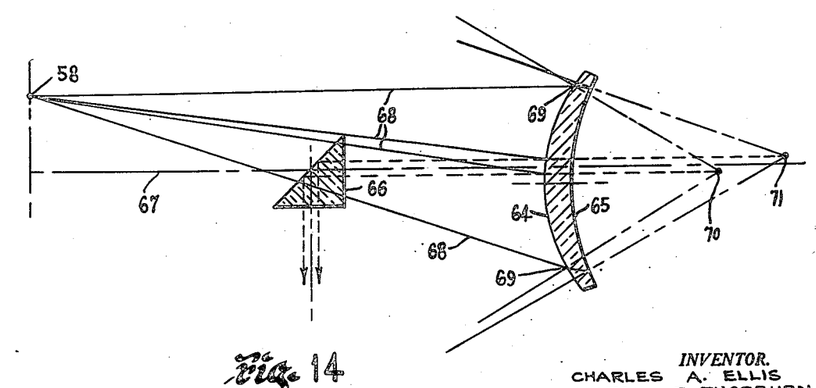
Fig. 14 is a view similar to Fig. 12 illustrating a lens having its convex surface directed toward the light source.

In the case of a lens 41 having a convex surface directed toward the light source, as shown in Fig. 14, the light rays 68 will be reflected so as to form virtual images 70 and 71 on which the telescope 22 must be focused.

When using a device of this character in ascertaining the degree of error in the cylinder axes, for example, of the surfaces of a lens having different powers in each surface, the lens is mounted upon the protractor element as described.

The lens may have two finished surfaces or may have one finished surface and a second partially finished surface, which second surface it is desired to axially align with the finished surface. An unfinished surface will, of course, generally have applied thereto a fluid of proper index of refraction so that the said surface will produce an image and which also will enable the image from the finished surface to be observed through the lens for comparison purposes as set forth above. In carrying out this example, assuming that the rear surface of a lens 41 is finished and the front surface is semi-finished, the semi-finished surface will, due to its attachment to the block, generally be directed toward the light source 49 when the bridle is in position on the protractor element 26. However, in this connection it is to be understood that the bridle 38 having the lens 41 attached thereto can be mounted on the protractor element with the finished surface directed toward the light source if desired, in which case the lens surfaces will be viewed through the openings 45 and 46 in the block 42 and adhesive 43 respectively.

Figure 6:
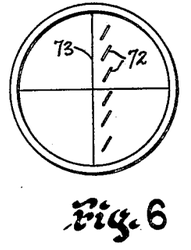
Figs. 6, 7, 8, 9, 10 and 11 are diagrammatic views illustrating various images received in the telescopic device.
Figure 7:
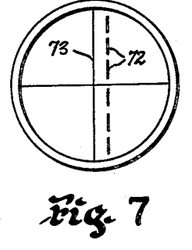

After mounting the bridle 38 on the protractor element 26, the supporting member 31 can be moved so as to position the center of the lens in substantial alignment with the axis of rotation of the protractor element 26. Then, after positioning the light source 49 as desired in offset relation with the lens axis 67, the telescope is focused upon the image point 71 reflected from the finished lens surface 65. The image will appear in the telescope 22 as a plurality of lines 72 of light as seen in Fig. 6, the number of lines of light being consistent with the number of lamps 58 used, and each of which is angularly disposed with respect to the vertical hair line 73 in the telescope 22. By rotating the protractor element 26, and consequently the lens 41, the image lines 72 can be made to parallel the hair line 73 as shown in Fig. 7. At this time a reading is taken from the protractor scale 26a.

Figure 8:
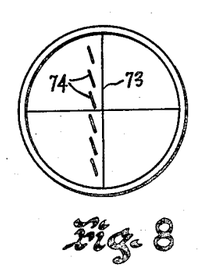
Figure 9:
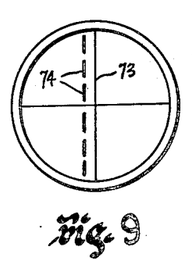

Then the telescope is focused upon the image point 70 reflected from the semi-finished surface 64 and this astigmatic image will appear as lines 74 of light (Fig. 8) disposed angularly with respect to the hair line 73. Then by again rotating the protractor element 26, the lens 41 will also be rotated, and the image lines 74 can be made to parallel the hair line 73 as shown in Fig. 9. At this time another reading is taken from the scale 26a and the difference between the readings will inform the operator of the degree of error in axial alignment between the finished surface and the semi-finished surface, which error can be corrected when subsequently finishing the semi-finished lens surface.

Figure 10:
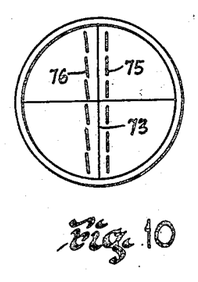
Figure 11:
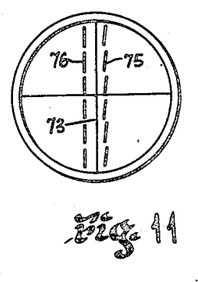

The foregoing example dealt with a lens having different prescriptive powers in each surface. However, in the case of a lens having the same power in each surface, the image points 70 and 71 will lie substantially in a plane whereupon the images will both appear simultaneously in the telescope, as shown in Figs. 10 and 11. In Fig. 10 one image line 75 is parallel to the hair line 73 while the other image line 76 is disposed angularly thereto. By taking a reading, then rotating the protractor 26 and lens 41 to cause the image line 76 to become parallel to the hair line 73, and then again taking a reading, the operator can easily and quickly learn the degree of error between the axes of the lens surfaces.

It is to be understood that in using this device, the images focused upon and used in checking the axial alignment of the lens surfaces must both be formed by the same surface curvature. That is, if the image formed by the cylinder (or base) curve is used for one surface, the same cylinder (or base) curve image must be used for the other surface.

When using this device to measure the amount of prism in a lens, the lens is mounted as aforementioned on the protractor element 26 and the element 26 is spaced a predetermined distance from the light source 49 which is positioned in vertical alignment with the optical axis 67 of the lens. This will cause the image of one of the surfaces to be formed on the axis 67 and appear at the intersection of the cross hairs 73 in the telescope 22. However, the image formed by the opposed lens surface will be offset from the axis line 67 an amount in accordance with the amount of prism present in the lens. Then by moving the light device 49 in the guideway 63 the offset image can be made to appear at the intersection of the cross hairs 73 and a reading which may be interpreted to indicate the prism in the lens is taken from the scale 62a.

From the foregoing it will be understood that the present invention overcomes many undesirable features of prior methods for axially aligning lens blanks with other devices by providing simple and efficient means for obtaining true readings indicating the exact axial relation of the opposed surfaces of the lens blanks by eliminating much of the human element, and further improves upon the prior art by providing such a device which can be used with much greater efficiency and more accuracy in such operations.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

We claim:

1. In a device for determining the axial relation of the surfaces of a bitoric lens, the combination of a support for carrying said lens, illuminating means spaced from said support and embodying point sources of light arranged in a substantially straight line and disposed in a plane substantially parallel to the plane in which the lens under test is supported for directing light upon said lens to form linear images of said point sources indicative of the axes of the surfaces by reflection of the light from said surfaces, and telescope means spaced from said support for viewing said images and having reference marks disposed in the line of sight thereof and appearing as intersecting the optical axis of the lens to provide means with which said images can be compared, and means for offsetting said point sources of light controllable amounts from the optical axis of said lens for causing said images to be separated when viewed simultaneously in said telescope means.

2. A device for determining the axial relation of the surfaces of a bitoric lens comprising a support for the lens under test, linearly arranged point sources of light facing the support and disposed in a plane spaced from and substantially parallel with the plane in which the lens is to be supported to form an astigmatic image of said point sources of light by each of the respective surfaces of the lens under test, said images each appearing on reflection as lines of light extending in the direction of the axis of said surface, means for viewing each of said reflected images, a reference line in the line of sight of said viewing means and viewable as passing through the center of the lens surface under test and substantially parallel with said linearly arranged point sources of light, said lens support being rotatable about the center of said lens surface to bring the lines of light forming each of said reflected images into substantial axial alignment with each other and parallel with said reference line, and means for determining the amount of rotation required to bring the lines of light of each of said images into said parallel relation.

3. A device for determining the axial relation of the surfaces of a bitoric lens comprising a pair of spaced supports one having means for supporting the lens under test in a given plane and target means embodying linearly arranged point sources of light carried by the other support and facing the first support to form an astigmatic image of said point sources of light on the respective surfaces of the lens under test, each of said images appearing on reflection as lines of light extending in the direction of the axis of said surfaces, a focusing device for viewing each of said reflected images, a reference line in the line of sight of said focusing device and viewable as passing through the center of the lens surface under test and substantially parallel with said linearly arranged point sources of light, one of said mentioned means being rotatable about an axis disposed normal to and passing through the center of the lens surface under test to bring the lines of light forming each of said reflected images into substantial axial alignment with each other and parallel with said reference line, and means for determining the amount of rotation required to bring the lines of light of each of said images into said parallel relation.

4. A device for determining the axial relation of the surfaces of a bitoric lens comprising a main support carrying a plurality of upright portions, means on one of said uprights for supporting the lens under test in a given plane, linearly arranged point sources of light carried by a second upright, said point sources of light facing the lens carrying upright support and being disposed in a plane spaced from and substantially parallel to the plane in which the lens is to be supported, to form an astigmatic image of said point sources of light appearing on reflection from the respective surfaces as lines of light extending in the direction of the axis of said surface, focusing means carried by a third upright, said focusing means being adjustable to permit viewing of each of said reflected images, a reference line in the line of sight of said focusing means and viewable as passing through the center of the lens surface under test and substantially parallel with said linearly arranged point sources of light, said lens supporting means on the first upright being rotatable about said center of the lens surface under test to bring the lines of light forming said reflected images as viewed through the focusing means into substantial axial alignment with each other and parallel with said reference line, and means for determining the amount of rotation required to bring each of said images into parallel relation with said reference line.

5. A device for determining the axial relation of the surfaces of a bitoric lens comprising a main support carrying a plurality of upright portions, means on one of said uprights for supporting the lens under test in a given plane, a plurality of spaced point sources of light carried by a second upright and facing the lens carrying upright support, said point sources of light being arranged in a line disposed in a plane spaced from and substantially parallel to the plane in which the lens is to be supported and adjacent the optical axis of said lens, to form an astigmatic image of said point sources of light appearing on reflection from the respective surfaces as lines of light extending in the direction of the axis of said surface, focusing means carried by a third upright, said focusing means being adjustable to permit viewing of each of said reflected images, a reference line in the line of sight of said focusing means and viewable as passing through the optical axis of the lens under test, said lens supporting means on the first upright being rotatable about said optical axis to bring the lines of light forming each of said reflected images as viewed through the focusing means into substantial axial alignment with each other and a given angular relation with said reference line, and means for determining the amount of rotation required to bring each of said images into said angular relation with the reference line.

6. A device for determining the axial relation of the surfaces of a bitoric lens comprising a main support carrying a plurality of upright portions, means on one of said uprights for supporting the lens under test in a given plane, linearly arranged point sources of light carried by a second upright, said point sources of light facing the lens carrying upright support and being disposed in a plane spaced from and substantially parallel to the plane in which the lens is to be supported, said second upright being mounted for adjustment in a direction parallel to the general plane in which said lens is supported to permit the linearly arranged points of illumination to be disposed in desired relation to the optical axis of said lens, and means for indicating the extent of spacing therefrom, said point of illumination forming an astigmatic image appearing on reflection from the respective surfaces as lines of light extending in the direction of the axis of said surfaces, focusing means carried by a third upright, said focusing means being adjustable to permit viewing of each of said reflected images, a reference line in the line of sight of said focusing means and viewable as passing through the optical axis of the lens under test and substantially parallel with said linearly arranged point sources of light, said lens supporting means on the first upright being rotatable to bring the lines of light forming said reflected images as viewed through the focusing means into substantial axial alignment with each other and parallel with said reference line, and means for determining the amount of rotation required to bring each of said images into alignment therewith.

7. A device for determining the axial relation of the surfaces of a bitoric lens comprising a main support carrying a plurality of upright portions, means on one of said uprights for supporting the lens under test in a given plane, a plurality of spaced point sources of light carried by a second upright and facing the lens carrying upright support in spaced relation thereto, said points of illumination being disposed in a straight line extending in a direction substantially parallel to the plane in which the lens is to be supported and adjacent the optical axis of said lens, to form an astigmatic image of said point sources of light appearing on reflection from each of the respective surfaces as lines of light extending in the direction of the axis of said surface, focusing means carried by a third upright, located adjacent said optical axis of the lens to receive said reflected images, at least one of said uprights being adjustable in the direction of said optical axis to permit said images to be received by the focusing means, a pair of normally disposed reference lines in the line of sight of said focusing means and viewable as passing through the optical axis of the lens under test, said lens supporting means on the first upright being rotatable about said optical axis to bring the lines of light forming each of said reflected images as viewed through the focusing means into substantial axial alignment with each other and parallel with one of said reference lines, and means for determining the amount of rotation required to bring each of said images into said parallel relation with the reference line.

8. A device for determining the axial relation of the surfaces of a bitoric lens comprising a main support carrying a plurality of upright portions, means on one of said uprights for supporting the lens under test in a given plane, a plurality of spaced point sources of light carried by a second upright, and facing the lens carrying upright support in spaced relation thereto, said points of illumination being disposed in a straight line extending in a direction substantially parallel to the plane in which the lens is to be supported and adjacent the optical axis of said lens, to form an astigmatic image of said point sources of light appearing on reflection from the respective surfaces as lines of light as extending in the direction of the axis of said surface, focusing means carried by a third upright located adjacent said optical axis of the lens to receive said reflected images, at least one of said uprights being adjustable in the direction of said optical axis to permit said images to be received by the focusing means, a pair of normally disposed reference lines in the line of sight of said focusing means and viewable as passing through the optical axis of the lens under test, said second upright being adjustable in a direction substantially normal to said optical axis to permit adjustment of the images in controlled spaced relation to the reference lines, and said lens supporting means on the first upright being rotatable to bring the lines of light forming said reflected images as viewed through the focusing means into substantial axial alignment with each other and parallel with one of said reference lines, and means for determining the amount of rotation required to bring each of said images into alignment therewith.

9. A device for determining the axial relation of the surfaces of a bitoric lens mounted on a bridle-type holder comprising a main support carrying a plurality of upright portions, an axially rotatable member mounted on one of said uprights, holding means on said rotatable member for releasably supporting the holder with the lens under test, and means for adjusting said holding means to locate the lens with its axis in coincidence with the axis of said rotatable member, a point source of light carried by a second upright, said point source of light facing the lens carrying upright support and being disposed adjacent the optical axis of the lens under test to form an astigmatic image of said point source of light appearing as effected by the respective surfaces as lines of light extending in the direction of the axes of said respective surfaces, focusing means carried by a third upright, said focusing means being adjustable to permit viewing of each of said reflected images, a reference line in the line of sight of said focusing means and viewable as passing through the optical axis of the lens under test and substantially parallel with said lines of light, said rotatable member on the first upright being rotatable to bring the lines of light forming said images as viewed through the focusing means into substantial axial alignment with each other and parallel with said reference line, and said point source of light being adjustable in a direction substantially normal to said optical axis to permit adjustment of the spacing of the said images relative to the reference line.

10. A device for determining the axial relation of the surfaces of a bitoric lens mounted on a bridle-type holder comprising a main support carrying a plurality of upright portions, an axially rotatable member mounted on one of said uprights, holding means on said rotatable member for releasably supporting the holder with the lens under test, and means for adjusting said holding means to locate the lens with its axis in coincidence with the axis of said rotatable member, linearly arranged point sources of light carried by a second upright, said point sources of light facing the lens carrying upright support and being disposed in a plane spaced from and substantially parallel to the plane in which the lens is to be supported, to form an astigmatic image of said point sources of light appearing as effected by the respective surfaces as lines of light extending in the direction of the axis of said surface, focusing means carried by a third upright, said focusing means being adjustable to permit viewing of each of said reflected images, a reference line in the line of sight of said focusing means and viewable as passing through the optical axis of the lens under test and substantially parallel with said linearly arranged point sources of light, said rotatable member on the first upright being rotatable to bring the lines of light forming said images as viewed through the focusing means into substantial axial alignment with each other and parallel with said reference line, and means for determining the amount of rotation required to bring each of said images into alignment therewith.

11. A device for determining the axial relation of the surfaces of a bitoric lens mounted on a bridle-type holder comprising a main support carrying a plurality of upright portions, an axially rotatable member mounted on one of said uprights, holding means on said rotatable member for releasably supporting the holder with the lens under test, and means for radially adjusting said holding means to locate the lens with its axis in coincidence with the axis of said rotatable member, a plurality of spaced point sources of light carried by a second upright and facing the lens molding means in spaced relation thereto, said point sources of light being disposed in a substantially straight line extending in a direction substantially parallel to the plane in which the lens is to be supported and adjacent the optical axis of said lens, to form an astigmatic image of said point sources of light appearing as reflected by the respective surfaces as lines of light extending in the direction of the axis of said surfaces, image receiving means carried by a third upright and located to receive said images, at least one of said uprights being adjustable in the direction of said optical axis to permit each of said images to be received by the image receiving means, a reference line viewable in said image receiving means as passing through the optical axis of the lens under test, said rotatable member on the first upright being rotatable to bring the lines of light forming each of said images into substantial axial alignment with each other and at a desired relation with said reference line, and means for determining the amount of rotation required to bring each of said images into said alignment therewith.

12. A device for determining the axial relation of the surfaces of a bitoric lens mounted on a bridle-type holder comprising a main support carrying a plurality of upright portions, an axially rotatable member mounted on one of said uprights, holding means on said rotatable member for releasably supporting the holder with the lens under test, and means for radially adjusting said holding means to locate the lens with its axis in coincidence with the axis of said rotatable member, a plurality of spaced point sources of light carried by a second upright and facing the lens holding means in spaced relation thereto, said point sources of light being disposed in a substantially straight line extending in a direction substantially parallel to the plane in which the lens is to be supported and adjacent the optical axis of said lens to form an astigmatic image of said point sources of light appearing as reflected by the respective surfaces as lines of light extending in the direction of the axis of said surfaces, image receiving means carried by a third upright and located to receive said images, at least one of said uprights being adjustable in the direction of said optical axis to permit each of said images to be received by the image receiving means, a pair of normally disposed reference lines viewable in said image receiving means as passing through the optical axis of the lens under test, said rotatable member on the first upright being rotatable to bring the lines of light forming one of said images into substantial axial alignment with each other and parallel with one of said reference lines, and means for determining the amount of rotation required to bring each of said images into said alignment therewith, said second upright being adjustable in directions substantially normal to said axis to permit the images to be adjusted toward and away from the nearly parallel reference lines and means for indicating the extent of spacing therefrom.

13. A device for determining the axial relation of the surfaces of a bitoric lens comprising a main support carrying a plurality of supporting members, holding means on a first supporting member for releasably supporting the lens under test with its axis in substantial coincidence with a predetermined axis of the device, a point source of light carried by a second supporting member, said point source of light facing the holding means and in spaced relation thereto, said point source of light being disposed adjacent said predetermined axis with which the axis of the lens under test when properly supported coincides, whereby an astigmatic image of said point source of light will be reflected by each of the respective surfaces of the lens to appear as lines of light extending in the direction of the axes of said respective surfaces, focusing means carried by a third supporting member and adapted for viewing said images, said focusing means being adjustable to permit separate viewing of each of said reflected images, a reference line in the line of sight of said focusing means and viewable as passing through the said predetermined axis and substantially parallel with the images reflected by each of the respective surfaces of the lens, said point source of light being mounted on the second supporting member for movement in a direction transversely of said predetermined axis and through a plane disposed substantially parallel to the plane in which said lens is properly supported to permit the images reflected by each of the surfaces to be brought into substantial coincidence with the reference line, and means on said device indicating the amount of adjustment required of the point source of light to bring the image reflected by the second surface once the image reflected by the first surface has been brought into substantial coincidence, the amount of adjustment required being an indication of the amount of prism in the lens.

14. A device for determining the axial relation of the surfaces of a bitoric lens comprising a main support carrying a plurality of uprights, an axially rotatable member mounted on one of said uprights, holding means on said rotatable member for releasably supporting the lens under test, said holding means locating the lens with its axis in substantial coincidence with the axis of said rotatable member, a point source of light carried by a second upright, said point source of light facing the holding means and in spaced relation thereto, said point source of light being disposed adjacent the axis of the rotatable member, whereby an astigmatic image of said point source of light will be reflected by each of the respective surfaces of the lens when properly supported to appear as lines of light extending in the direction of the axes of said respective surfaces, viewing means carried by a third upright and adapted for viewing said images, a reference line in the line of sight of said viewing means and viewable as passing through the axis of the rotatable member and substantially normal thereto, said rotatable member being rotatable on the first upright about its axis to bring the lines of light forming each of said images as viewed through the viewing means into substantial parallel alignment with said reference line, said second upright carrying the point source of light being adjustably mounted for movement in a direction transversely of said axis about which the rotatable member rotates and through a plane disposed substantially parallel to the plane through which the rotatable member is rotated to permit the images of the point source of light reflected by each of the surfaces to be brought into substantial coincidence with the reference line, and means on said main support and second upright cooperatively indicating the amount of adjustment required of the point source of light to bring the image reflected by the second surface once the image reflected by the first surface has been brought into substantial coincidence, the amount of adjustment required being an indication of the amount of prism in the lens.

15. A device for determining the axial relation of the surfaces of a bitoric lens comprising a main support carrying a plurality of uprights, an axially rotatable member mounted on one of said uprights, holding means on said rotatable member for releasably supporting the lens under test, and means for adjusting said holding means to locate the lens with its axis in substantial coincidence with the axis of said rotatable member, a point source of light carried by a second upright, said point source of light facing the holding means and in spaced relation thereto, said point source of light being disposed adjacent the axis of the rotatable member, whereby an astigmatic image of said point source of light will be reflected by each of the respective surfaces of the lens when properly supported and appear as lines of light extending in the direction of the axes of said respective surfaces, focusing means carried by a third upright and adapted for viewing said images, said focusing means being adjustable to permit separate viewing of each of said reflected images, a reference line in the line of sight of said focusing means and viewable as passing through the axis of the rotatable member and substantially normal thereto, said rotatable member on the first upright being rotatable about its axis to bring the lines of light forming each of said images as viewed through the focusing means into sugstantial parallel alignment with said reference line, said point source of light being adjustably mounted for movement in a direction transversely of said axis about which the rotatable member rotates and through a plane disposed substantially parallel to the plane through which the rotatable member is rotated to permit the images reflected by each of the surfaces to be brought into substantial coincidence with the reference line, and means on said device indicating the amount of adjustment required of the point source of light to bring the image reflected by the second surface once the image reflected by the first surface has been brought into substantial coincidence, the amount of adjustment required being an indication of the amount of prism in the lens.

References Cited in the file of this patent

UNITED STATES PATENTS

| Number | Name | Date |
|---|---|---|
| 1,083,309 | Troppman | Jan. 6, 1914 |
| 1,528,138 | Watson | Mar. 3, 1925 |
| 1,608,725 | Currier et al. | Nov. 30, 1926 |
| 2,042,565 | Tillyer | June 2, 1936 |
| 2,114,282 | Ames, Jr. et al. | Apr. 19, 1938 |
| 2,129,889 | Tillyer | Sept. 13, 1938 |

FOREIGN PATENTS

| Number | Country | Date |
|---|---|---|
| 696,598 | France | Oct. 14, 1940 |
| 699,212 | Germany | Nov. 25, 1940 |